United States Patent [19]

Bolger

[11] 4,261,446

[45] Apr. 14, 1981

[54] REMOVABLE CLOSURE SUBASSEMBLY FOR A SEALED STRUT

[76] Inventor: Joseph E. Bolger, Summer St., Barre, Mass. 01005

[21] Appl. No.: 59,434

[22] Filed: Jul. 20, 1979

[51] Int. Cl.³ .............................................. F16F 9/32
[52] U.S. Cl. .................................. 188/322; 29/401.1; 29/402.08
[58] Field of Search ................ 29/401.1, 401.8, 402.4, 29/402.8; 188/321, 322; 267/2; 280/702

[56] References Cited

U.S. PATENT DOCUMENTS

| 1,909,582 | 5/1933 | Hopkinson et al. | 188/322 X |
| 4,020,929 | 5/1977 | Goldin | 188/321 |

FOREIGN PATENT DOCUMENTS 2658835  6/1978  Fed. Rep. of Germany ........... 188/321

Primary Examiner—Duane A. Reger
Attorney, Agent, or Firm—Ross, Ross & Flavin

[57] ABSTRACT

A removable lockable slip-type closure subassembly allowing the fitting of accessory shock inserts or cartridges to the commercially-available, sealed, normally non-rebuildable, struts.

1 Claim, 4 Drawing Figures

REMOVABLE CLOSURE SUBASSEMBLY FOR A SEALED STRUT

This invention relates to an improvement in strut type suspension systems where the shock absorber subassembly of the so-called cartridge-type is deployed within the strut housing and the improvement may be identified as a removable, lockable, slip-type closure subassembly adapted to be fitted to a sealed strut following rupture of same by way of a severing action so as to render the strut reusable.

As known, shock absorbers are provided in vehicles to cushion or damp the relative motion between vehicle body and running gear. Direct, double acting, hydraulic shock absorbers, when mounted on vehicles, usually have their opposite ends connected respectively between frame and axle. When the vehicle's springs are compressed, as occurs when the wheels strike a roadway elevation, the pistons of the shock absorbers move in compression stroke, that is inboard of their cylinders; and when the vehicle's springs are expanded, the pistons move in rebound stroke, that is, outboard of their cylinders, all with controlled fluid flow through or around the pistons from one side to the other thereof during these compression and rebound strokes.

By design of their manufacturers, certain makes of commercially available strut systems are now structured as by a sealing configuration so that any replacement of the shock absorber or insert subassembly therewithin is discouraged, if not practically precluded. The strut is sufficiently sealed so as to make such replacement a matter of more work and expense than the work and expense of simply replacing the complete strut.

Such design on the part of manufacturers of the strut systems has had an adverse effect on the accessory people whose market in cartridge-type shock absorber or insert subassemblies has been seriously dwindling.

The cost factor for the ultimate consumer is made significant by the invention hereof, it now being possible to reduce costs by as much as approximately one half. For example, the former dictate of a substitute 75-100.00 strut is now responded to by the availability of replacement subparts not exceeding costs in the area of $35-50.00.

Here, an original strut system can be conveniently modified and shock cartridge replaced in lieu of the need for any replacement with an entirely new strut, as the invention allows the fitting of an accessory shock insert or cartridge to a sealed, normally non-rebuildable commercially-available strut.

Standard or even superior grade cartridges may now be fitted in a simple, straightforward manner with significant cost reductions.

A further salient advantage is obtained in the fact that it is now possible to resort to any of a plurality of cartridges, as supplied by a multiplicity of accessory manufacturers, same being fairly interchangeable, one with another, and to fit same to any of the standard struts, all so as to avoid the aforesaid required replacement of a completely new strut assembly for a malfunctioning original.

Figure 1:
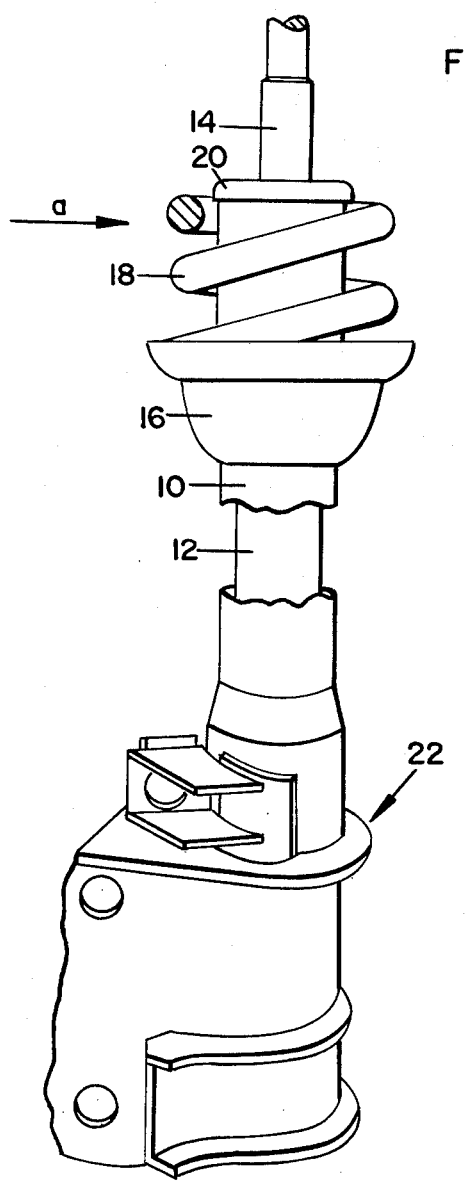
FIG. 1 is a broken elevational view showing a typical conventional strut to which the subassembly of my invention may be applied.

A typical conventional strut is shown in FIG. 1 as comprising a strut suspension body 10 of tubular configuration and in which a cartridge shock 12 is receivable, with the distal end of a piston 14 thereof being extendable outwardly therefrom.

A lower collar 16 circumscribes and is rigid to body 10 and seats a coil spring 18, the upper extremity of which bears against an upper collar 20 which likewise circumscribes and is crimped to body 10. The upper collar serves to close off the body interior which serves as the fluid chamber and to restrict relative movement of the cartridge shock to the strut suspension body.

The lower extremity of body 10 mounts a lower strut end subassembly generally designated by 22 of any selected one of various configurations, each being adapted to be suitably tied to such as a vehicle axle of a particular vehicle make and type. The upper extremity of piston 14 will be understood to be normally attached to the vehicle frame in the usual and well known manner.

That is, the cartridge shock is operatively connected to one part of a pair of relatively movable parts of a vehicle, with its piston being reciprocably mounted in the cylinder and operatively connected to the other part of the pair, all so as to offer a moderate retarding effect on the parts as the latter are relatively moved throughout a predetermined normal range of travel in one direction and a relatively greater retarding effect as relative movement of the parts is continued in the same direction beyond the predetermined range.

As explained above, certain of the presently available strut systems are now so structured that any replacement of the shock absorber subassembly therewithin is discouraged, if not practically precluded, the strut being sufficiently sealed so as to make such replacement a matter of more work and expense than the work and expense of simply replacing the complete strut.

The modification system of this invention designed to give an alternative answer to this situation envisions a cutting transversely through the top of the strut body 10 immediately below the upper collar 20 and in a plane designated by arrow a, all so as to separate the upper collar from the top of the strut body, ergo to afford access to the strut interior.

The to-be-replaced cartridge 12 is removed therefrom by its withdrawal upwardly and outwardly through the now provided opening and is replaced by a new or replacement cartridge 12a having a piston 14a, care being taken to insure that same is fully bottomed within the strut by bumping the lower extremity of the strut on a solid surface while holding down on the new cartridge with the free hand.

So properly bottomed, reference is then made to the two-part removable lockable slip-type of closure subassembly of the invention.

A tubular slotted collar 30 having an I.D. such as to allow its being fitted snugly over the body and an associated cap nut 32 threadedly engaged therewith are slid down upon the strut until the cap nut is in kissing relation with the top of the new cartridge 12a.

Cap screws 34 are then threaded into the aligned openings in the collar on both sides of the provided slot

36 so as to draw the confronting faces of the collar toward each other and in tight embracement around the strut body 10 all so as to define a removable lockable slip-type closure subassembly.

Figure 2:
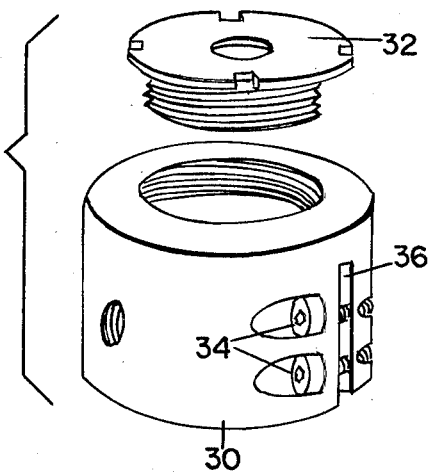
FIG. 2 is an enlarged isometric exploded view of one of the forms of collar and nut of the invention.
Figure 3:
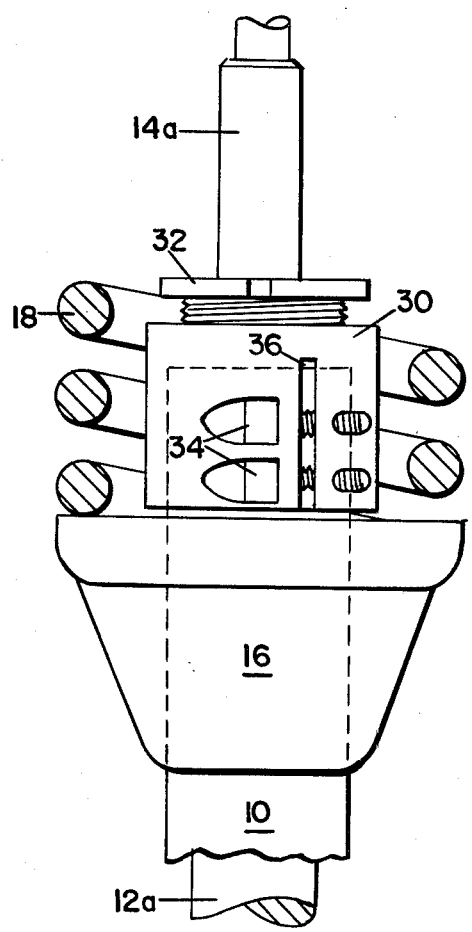
FIG. 3 is an enlarged fragmentary view of the upper part of a conventional strut with the FIG. 2 subassembly fitted thereto.
Figure 4:
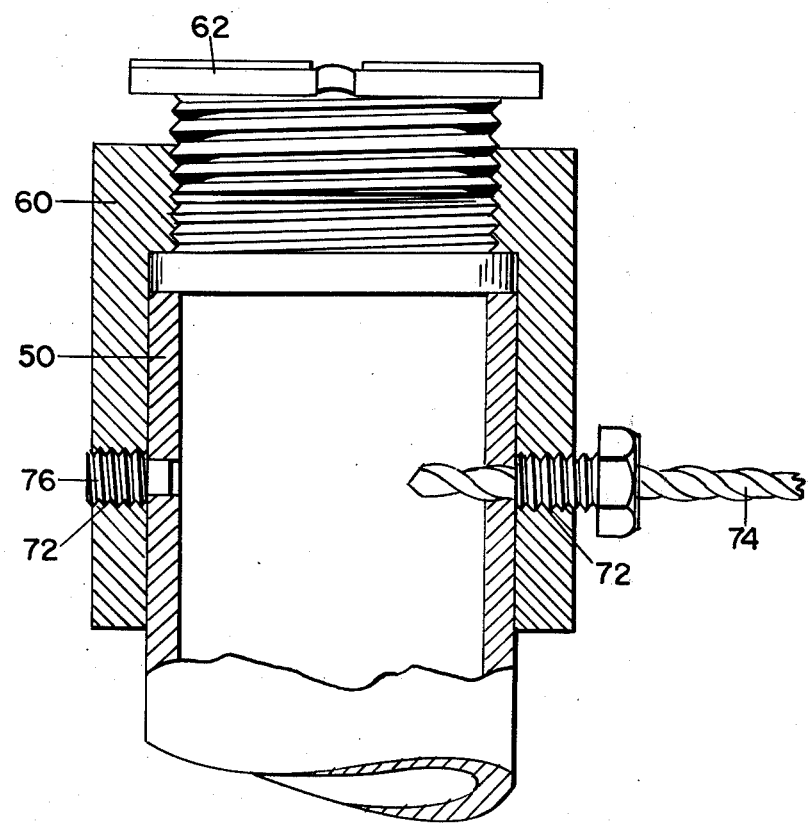
FIG. 4 is a fragmentary sectional view of another typical strut to which a second form of collar and nut subassembly of the invention may be applied.

I have shown in FIGS. 4 and 5, another form of collar and nut subassembly wherein the split collar configuration of FIGS. 2 and 3 has been replaced by a different construction.

A conventional strut of another typical configuration has been shown having the strut suspension body 50 of tubular configuration within which the usual cartridge shock is slidably received and from which shock a piston will extend.

As earlier stated, in its modification the top of the body of the sealed strut is cut off slightly below its upper extremity.

The to-be-replaced cartridge is first removed and the new cartridge is inserted into the body 50, again insuring that the cartridge is suitably bottomed within the body.

A hex nut 62 is then threadedly engaged with a tubular collar 60 and the combination is then sleeved over the extended piston and body 50.

Preferentially, 2 or 3 threads of the hex nut are first left visible just above the top of the collar as this sliding down procedure ensues, as is shown in FIG. 4.

The sliding down procedure of collar on body proceeds until the hex nut contacts the top of the cartridge.

A hollow bolt 70 is then screwed onto one of a trio of provided threaded openings 72 and is tightened.

The trio of openings are equispaced around the collar periphery.

Therefollowing, the hex nut is unscrewed from the collar and the cartridge is removed.

Using an appropriately-sized drill 74 and inserting same through hollow bolt 70, the user now drills through the strut body wall, then removes the hollow bolt 70 and installs and tightens a dog-point set screw 76, insuring that the dog point will have entered the drilled hole in the strut, tightening same until the set screw is flush with the interior body surface.

This procedure is repeated in the two other openings 72, using the hollow bolt as before and installing and tightening the remaining two set screws.

The new cartridge is then again inserted and the hex nut is drawn down to the recommended torque.

Therefollowing the three set screws should be staked as by a centerpunch.

Thus the method aspect of the invention involves the drilling of the trio of openings in the strut body, in which openings the ends of the dog-point set screws are receivable with the result that, instead of primarily clamping collar to body, a straight shear is now provided by virtue of the dog points.

If desired, the strut to collar joint may be sealed with silicone or other sealant to prevent moisture from entering the cartridge area.

It should be added here that in the earlier prior art cases, the original strut as delivered on the vehicle was without a cartridge as such. The strut outer wall served actually as the reservoir and if and when a cut was made therethrough, access was had to the oil supply and the internals generally. A like situation obtained with the early rebuildable struts as the seals, shaft, damper pieces and the like all could be removed, replaced if desired and assembled anew. It was with this background history in mind that the shock absorber people conceived of the insert or cartridge which could be dropped within the strut body so as to eliminate the obvious so called headaches.

The embodiments of the invention in which an exclusive property or privilege is claimed are defined as follows:

1. In the category of a replaceable shock insert in a sealed strut construction which will have been severed at its top, a combination of mechanical parts and sequence of functions comprising:

a slip-type collar closure slidably receivable over the so-severed strut, a nut closure threadedly engageable with the collar closure, and tightening means for drawing the collar closure into tight embracement with the strut.

* * * * *